(12) United States Patent
Alard et al.

(10) Patent No.: US 6,263,029 B1
(45) Date of Patent: Jul. 17, 2001

(54) DIGITAL SIGNAL WITH MULTIPLE REFERENCE BLOCKS FOR CHANNEL ESTIMATION, CHANNEL ESTIMATION METHODS AND CORRESPONDING RECEIVERS

(75) Inventors: Michael Alard, Paris; Mohamed Siala, Malakoff, both of (FR)

(73) Assignee: Wavecom, Issy les Moulineaux (FR)

( * ) Notice: Subject to any disclaimer, the term of this patent is extended or adjusted under 35 U.S.C. 154(b) by 0 days.

(21) Appl. No.: 08/839,255

(22) Filed: Apr. 17, 1997

(Under 37 CFR 1.47)

(30) Foreign Application Priority Data

Apr. 19, 1996 (FR) .................................................. 96 05200

(51) Int. Cl.7 ........................................................ H03D 1/00
(52) U.S. Cl. .............................................................. 375/340
(58) Field of Search ..................................... 375/206, 231, 375/340, 139

(56) References Cited

U.S. PATENT DOCUMENTS

| | | | |
|---|---|---|---|
| 5,127,051 | * 6/1992 | Chan et al. | 375/206 |
| 5,329,547 | * 7/1994 | Ling | 375/231 |
| 5,539,412 | * 7/1996 | Mendelson | 342/192 |
| 5,581,580 | * 12/1996 | Lindbom et al. | 375/377 |
| 5,652,772 | * 7/1997 | Isaksson et al. | 375/365 |

FOREIGN PATENT DOCUMENTS

| | | |
|---|---|---|
| 0 597 317 | 5/1994 | (EP) . |
| 0 715 440 | 6/1996 | (EP) . |
| WO 94/28661 | 12/1994 | (WO) . |

\* cited by examiner

*Primary Examiner*—Chi Pham
*Assistant Examiner*—Kevin M Burd
(74) *Attorney, Agent, or Firm*—Kinney & Lange, P.A.

(57) ABSTRACT

A digital signal is organized in consecutive data trains each comprising a predetermined number of successive symbols, each of said data trains comprising at least two distinct reference blocks for the estimation of said channel, distributed among the useful symbols representing the source signal to be transmitted, each of said reference blocks being formed by at least one reference symbol known to the receiver and/or identifiable by said receiver. The reference symbols present in the reference blocks may be explicit reference symbols that are fixed and known a priori by said receiver and/or implicit reference symbols produced by the links generated between the useful symbols by an encoding operation. Also disclosed are channel estimation methods implementing an estimation-maximization algorithm and/or using a combination of predetermined basic functions, with a bandwidth greater than or equal to the Doppler power spectrum of said signal.

15 Claims, 9 Drawing Sheets

DIGITAL SIGNAL WITH MULTIPLE REFERENCE BLOCKS FOR CHANNEL ESTIMATION, CHANNEL ESTIMATION METHODS AND CORRESPONDING RECEIVERS

BACKGROUND OF THE INVENTION

1. Field of the Invention

The field of the invention is that of the transmission of digital data, especially in transmission channels showing or being capable of showing fast Doppler fading and low inter-symbol interference (ISI). More specifically, the invention relates to the estimation of the transmission channel and the demodulation in receivers of signals transmitted through such channels.

A preferred but not exclusive field of application of the invention is that of digital communications between satellites and moving bodies. It can be envisaged especially in the context of the ICO and Iridium projects. More specifically, the invention can be applied advantageously in all communication systems where the channel has fast Doppler fading and low ISI.

2. Description of the Prior Art

In conventional digital communication systems, synchronization symbols are frequently used. They enable the receiver not only to get synchronized but also to estimate the channel suitably in order to ensure the efficient running of the demodulation phase.

For these conventional communication systems, the synchronization symbols are consecutive and form a synchronization sequence that is generally placed at the beginning of the data train. The synchronization in the receiver is achieved by detecting a crossing of a threshold of the correlation of samples received with those of the sequence used for the synchronization. This synchronization is used firstly to detect the beginning of a data train and secondly to achieve a precise definition of the instants of maximum aperture of the eye diagram.

In the case of studies carried out for the GSM system, it has been sought to build synchronization sequences matched with the slow Doppler fading and high ISI channels. These studies have shown the value, for channels of this type, of placing these synchronization sequences in the middle of each data train.

The patterns of synchronization sequences proposed lead to synchronization and channel estimation algorithms that are intuitive and simple to implement. They are therefore adopted in several digital communications systems.

They are also envisaged in satellite telephony projects. However, they prove to be far less efficient for channels of this type and lead to major limitations of performance when channels with fast Doppler fading and low ISI such as satellite channels are considered.

The basic principle of temporal synchronization and channel estimation by the receiver is that of transmitting a sequence of symbols known to this receiver in the data train sent by the transmitter. Through the use of a few predefined algorithms, these symbols are exploited to ensure not only efficient synchronization of the receiver but also reliable estimation of the channel, thus enabling the efficient running of the demodulation phase.

The known systems make use of a synchronization pattern consisting of a sequence of symbols grouped together, having efficient correlation properties. These properties are profitably used chiefly to achieve efficient synchronization at the receiver. In the context of radio-mobile communication systems such as the GSM system, the channel is almost static during a data train but nevertheless undergoes very severe levels of ISI. These correlation properties then prove to be well suited and even necessary for a simple and direct estimation of the pulse response of the channel.

These synchronization sequences may be used in communication systems between satellites and moving bodies. It must be noted however that if the channels encountered in applications of this type have negligible ISI levels in relation to the symbol rate, their variations in terms of the data train received are great. In other words, the transmission channel then cannot be considered as being quasi-static during the period of a data train (in terms of time/frequency representation it can be said that these channels are dual to those presented here above).

Consequently, the use of a standard synchronization sequence in systems of this type is purely arbitrary, and resolves only the problem of synchronization in the receiver.

More specifically, while the choice of group synchronization in the context of quasi-static channels with high ISI (the standard case of GSM in particular) has a sound basis, this is not necessarily so for channels with fast Doppler fading and low ISI. These channels have considerable variations in terms of the data trains received. The sequence of standard synchronization symbols may ensure that the receiver is well synchronized. By contrast, the quality of channel estimation is severely compromised as it does not represent the state of the channel during the reception of the useful data elements of a data train.

The standard synchronization therefore is not suited to systems communicating through a channel with fast Doppler fading, for the channel estimation and demodulation function.

SUMMARY OF THE INVENTION

It is an aim of the invention, in particular, to overcome these drawbacks of the prior art in digital transmission systems organized in data trains and capable, at least in certain situations and/or at certain times, of being confronted with channels having fast Doppler fading that cannot be considered to be quasi-static over the duration of a data train.

More specifically, one of the aims of the invention is to provide structures of digital signals that are suited to transmission in channels with fast Doppler fading and can be used, in particular to obtain reliable channel estimation and demodulation in all circumstances.

Another aim of the invention is to provide signals of this kind that can be used simultaneously for the optimization, in the receivers, of the synchronization, the quality of channel estimation and, as the case may be, the efficiency of the interlacing of the encoded data elements. In other words, the invention should achieve a compromise between efficient synchronization, efficient channel estimation in the receiver and the efficient interlacing of the encoded data elements.

The invention is also aimed at providing signals of this kind that are simple to build in the transmitters and simple to decode and analyze in the receivers. Another aim of the invention also is to limit losses in useful bit rate, and therefore to limit the number of reference data elements needed.

Another aim of the invention is to provide channel estimation methods and corresponding receivers that are suited to such signals and more generally methods that can handle arbitrary patterns of synchronization.

An additional aim of the invention is to provide a channel estimator that can significantly improve its performance characteristics in taking account of all or part of the encoded structure of the data elements transmitted.

These aims as well as others that shall appear hereinafter are achieved according to the invention by means of digital signals organized in data trains, each data train containing least two distinct blocks of reference elements are distributed among the useful data elements.

In other words, the invention relates in particular to a digital signal organized in consecutive data trains, each comprising a predetermined number of successive symbols and being designed to be transmitted to at least one receiver in a transmission channel capable of showing notable variations within a data train, each of said data trains comprising at least two distinct reference blocks for the estimation of said channel, distributed among the useful symbols representing the source signal to be transmitted, each of said reference blocks being formed by at least one reference symbol (hereinafter also sometimes called a synchronization symbol when it is used also for the synchronization) known to the receiver and/or identifiable by said receiver.

The signal of the invention therefore has a structure that is quite different from that of standard signals, wherein the reference symbols, used to estimate the channel, are routinely assembled in a single synchronization block (generally at the beginning of the data train or possibly in the middle of this data train).

The approach of the invention, which runs counter through this standard technique, provides an efficient response to the problems related to channels with fast Doppler fading. Apart from the fact that the structure of the signal (the distribution of the reference blocks) is quite novel, it must be noted that it is in no way evident to those skilled in the art, especially as it is not compatible with conventional methods of channel estimation and decoding by means of a single reference block. As shall be seen hereinafter, the invention also relates to new methods and devices specific to the use of such signals.

The reference symbols present in the reference blocks of the invention may be of two types. They may be:

explicit reference symbols that are fixed and known on an a priori basis by said receiver; and/or implicit reference symbols produced by the links generated between the useful symbols by an encoding operation.

According to a particular embodiment, these implicit reference symbols may correspond to the repetition of a useful symbol at a predetermined location in said data train. These implicit reference symbols are therefore obtained in this case by means of a repetition code.

When the output desired for the application is compatible with the use of an encoding operation, especially a repetition encoding, it is possible to use both types of reference symbols, the implicit reference symbols being used to optimize the information elements obtained by means of the explicit reference symbols. Should there be only implicit reference symbols, it may be necessary to provide for a means to remove the phase ambiguity of the carrier that appears at reception.

Preferably, said reference blocks are equally distributed within the data train.

As mentioned further above, the signal of the invention requires the use of new estimation methods.

Thus a first method of estimation of a channel for the transmission of a digital signal of this kind (organized in consecutive data trains comprising at least two distinct reference blocks for the estimation of said channel distributed among the useful symbols representing the source signal to be transmitted, each of said reference blocks being formed by at least one reference symbol known to the receiver and/or identifiable by said receiver) implements an estimation-maximization (EM) algorithm [2–6] (the numbers in square brackets indicate references in an appended list). Such an estimation-maximization algorithm comprises the following steps for each of said data trains:

the extraction and/or determination of said explicit reference symbols;

the use of said explicit reference symbols to obtain a first estimation of said transmission channel;

the first estimation of said useful symbols as a function of said first estimation of the transmission channel;

and if necessary (as a function for example of the quality of the estimation obtained and the precision desired), at least one iteration of the following steps:

the determining of a second, more precise estimation of said transmission channel as a function of said first estimation of the useful symbols (capable in particular of including implicit reference symbols);

the second estimation of said useful symbols as a function of said second estimation of the transmission channel.

According to a particular embodiment that can be used especially when the code implemented is simple (not requiring any computation of probabilities for example), said step for the second estimation of said useful symbols may be integrated into said step for determining a second estimation of the transmission channel, the estimation of the useful symbols being used directly in the computation of the estimation of the transmission channel.

In other words, an estimation of the channel is then performed with an implicit estimation of the data elements.

A second method for the estimation of a transmission channel of a digital signal of this kind includes a step for the writing of said estimation in the form of a combination of predetermined basic functions, with a bandwidth greater than or equal to that of the Doppler power spectrum (DPS) of said signal.

Preferably, said basic functions are discrete prolate spheroidal sequences (DPSS) [8].

Functions of this type can be used to obtain a very precise estimation of the channel on the basis of a small number of basic functions (for example [3–8]).

According to an advantageous embodiment of the invention, this method includes a preliminary step for the matching of the characteristics of said basic functions, especially as a function of said Doppler power spectrum.

Thus, there is obtained a base that is matched as well as possible with the channel to be estimated.

The invention naturally also relates to the channel estimation devices and receivers implementing the methods described here above as well as to the transmitters and receivers of signals according to the invention.

BRIEF DESCRIPTION OF THE DRAWINGS

Other characteristics and advantages of the invention shall appear from the following description of a preferred embodiment of the invention given by way of a simple non-exhaustive illustrative example and from the appended drawings, of which.

1. GENERAL POINTS

Figure 1:
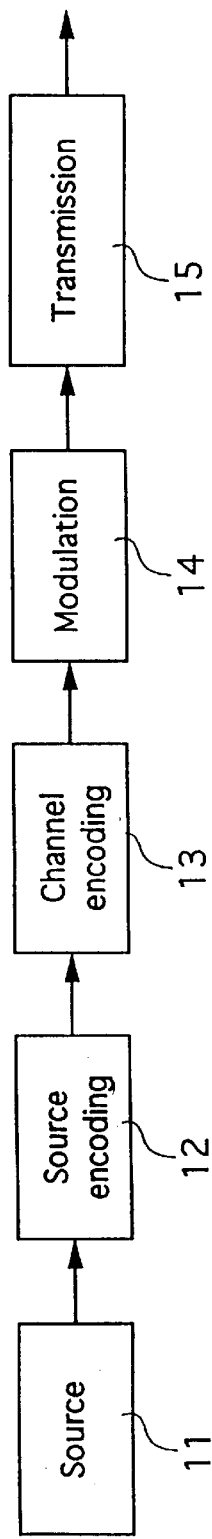
FIG. 1 is a block diagram of a transmitter of a signal according to the invention.

The invention can be applied especially to low ISI standing channels with DPS (Doppler power spectra) of any width and shape. In particular, these channels may be Rice type or Rayleigh type channels with horn-shaped or flat Doppler power spectra. In particular, they may include the case of a static frequency offset resulting from a partial correction of the frequency error of the local oscillator at the receiver. This correction is generally achieved by means of a conventional phase lock loop.

The invention proposes a novel signal structure in which several reference blocks are distributed in each data train.

Thus, an aim of the invention is to provide the most suitable synchronization pattern for a Doppler channel and communication system with given characteristics. This pattern must be sufficiently distributed on a variably extensive part of the data trains to characterize and estimate the significant variations of the channel as efficiently as possible and distribute the encoded data elements as efficiently as possible. This pattern should therefore not give preference to the performance characteristics of the receiver in terms of synchronization at the cost of a sacrifice of the quality of channel estimation and of the interlacing of the encoded data elements.

The corresponding channel estimation method proposed according to the invention relies in particular on an appropriate modelling of the real channel and a novel and simplified representation of this model.

This representation must take account as far as possible of all the known information on the channel. This information must include at least the maximum width of the Doppler band which must imperatively be known to the receiver.

Should the shape of the DPS of the channel not be known, the algorithm adopts a flat model-building of this channel. This modelling is the one most suitable from the viewpoint of information theory for it leads to a maximum channel entropy [7]. In this precise case, the discrete channel may be written as a combination of the restrictions of discrete prolate spheroidal sequences (DPSS) to the medium of the data train to be demodulated. These DPSS have a narrow band with a width equal to or greater than that of the DPS.

There are essentially two criteria that may be used to estimate one of the unknown parameters: the maximum likelihood (ML) criterion and the maximum a posteriori (MAP) criterion [1]. In the case of the ML criterion, the parameters are assumed to be deterministic but unknown. In the case of the MAP criterion, these parameters are assumed to be randomized and characterized by a density of probability (DP) of which there is a priori knowledge.

The ML criterion is the most appropriate for problems of estimation of energy by a transmitted symbol or of the noise variance at output of a given filter, when these characteristics are not known to the receiver. The MAP criterion is most suited to the problem of estimation of the discrete channel at the level of the data trains transmitted.

By means of the simplified representation of the channel developed by the inventors and presented hereinafter and (not obligatorily) by means of the reference symbols sent by the transmitter, the receiver implements the EM algorithm to perform an iterative estimation of a part or of all of these parameters according to the corresponding criteria.

In other words, this algorithm makes it possible to find the most likely channel realization conditionally with respect to the signal observed in the receiver. It can also be used to make the most efficient possible estimation of the energy per symbol transmitted and/or of the noise variance at output of a given filter when these factors are not totally known.

One of the advantages of the EM algorithm is that it enables the optimum use of the synchronization symbols (explicit reference) as well as all or a part of the characteristics of the information symbols (implicit reference) forming a data train in order to accomplish the channel estimation. More specifically, this algorithm enables the advantageous use of the encoding undergone by the information data elements sent in order to significantly improve the quality of the channel estimation. It also makes it possible to take account of the memory, possibly because of the modulation used.

This algorithm averts the need for resorting routinely to the standard grouped synchronization patterns which owe their success to the fact that they are immediately exploited by intuitive and simple algorithms.

The choice of the location of the reference symbols in the data trains is indeed important for the performance characteristics of the channel estimator. It is also vitally important in the efficient determining of the initial conditions of the algorithm EM. Indeed, this algorithm generally tends to converge towards local maximum values of conditional probability (defined as the a posteriori probability of a realization of the channel conditionally with respect to the signal received) if the location of the synchronization symbols is poorly chosen.

By means of the estimation of the channel, the receiver carries out a standard demodulation and/or a decoding of the information data received according to the ML criterion.

2. THE PRINCIPLE OF A TRANSMITTER

FIG. 1 shows a simplified block diagram of a transmitter of a signal formed by data trains according to the invention. The transmission method is deduced therefrom directly.

Let us consider an information source 11 with an arbitrary bit rate generating data that may be binary or not corresponding to source signals of any type (sounds, images, data, etc.). These data elements are if necessary subjected to a source encoding 12 followed by an error correction encoding 13 suited to Rice type channels without ISI.

The encoded data elements generated from these codes (useful symbols) are then organized in data trains and modulated (14). They are therefore appropriately distributed and interlaced on several data trains in order to provide the necessary diversity and decorrelate the fading that affects the symbols transmitted. Reference elements are also introduced into each data train according to the principles of distribution specified hereinafter. Finally, the data elements are phase modulated.

The baseband signal generated by the modulator 14 is obtained by the shaping filtration of the symbols forming the train. In the case of the PWM2 and PWM4 modulations, the shaping filter is generally a Nyquist root filter to prevent any ISI at output of the filter matched with the receiver. The baseband signal thus generated is then frequency transposed, amplified and transmitted (15) through the channel.

3. EXAMPLE: THE ICO SYSTEM

For example, here we present the transmission characteristics of the ICO (intermediate circular orbit) system of satellite radiocommunications to which this invention can be advantageously applied.

This system is based on a time-distributed multiple access (TDMA) technique. It is based on data frames, each formed by six time slots. These frames are transmitted upwards (from the moving body to the satellite) and downwards (from the satellite to the moving body) for both voice-dedicated and signalling-dedicated channels. To each time slot there corresponds a transmitted data train consisting of N=120 or n=240 symbols as the case may be.

All the logic channels used by the ICO system are very close to those of the GSM system. They include, in particular, a TCH (Traffic CHannel) at the upward and downward links, a BCCH (Broadcast Common CHannel) channel at the downward link and a RACH channel (random access channel) at the upward link.

The modulation adopted for the downward link is the PWM4 for the TCH and the PWM2 for the BCCH. In both cases, the number of symbols per data train is 120 (1 bit per symbol in PWM2; 2 bits per symbol in PWM4). The continuous-phase GMSK modulation, which is therefore a modulation with memory, is chosen at the upward link for reasons of non-linearity at the level of the mobile transmitters. The number of symbols transmitted is 240 for the TCH and 120 for the RACH. In both cases, a transmitted symbol corresponds to a transmitted bit.

Each logic channel has its own channel encoding and interlacing techniques. However, this encoding and interlacing are organized so as to enable the unifying, to the extent possible, of the structure of the decoder. Each logic channel can implement the following sequence of operations (each of these operations being optional):

the binary information elements are encoded with an external code in the form of a cyclical and systematic block;
  the binary elements resulting from this encoding are then encoded by the internal code, which is either of the extended Golay type or of the convolutive type;
  the encoded binary elements are then encoded by means of a repetition code;
  the encoded binary elements obtained are finally interlaced with an interlacing function.

The channel RACH conveys inter alia the identity of a mobile terminal that seeks to access the services of the ICO system. It requires a linking margin that is greater than the traffic channels. For this reason, it implements a Golay code followed by a repetition code (3,1,3).

According to the invention, the reference symbols are distributed among several blocks (of at least one symbol) in each data train.

The number of symbols used for the synchronization depends on the characteristics of the real transmission channel.

The transmission channel underlying the logic channel TCH is a Rice type channel (namely a channel formed by a direct path and a multiple-path portion with a relative delay that is almost zero as compared with the direct path) having a favorable ratio K between the power of the multiple path and that of the multiple paths, this ratio K having values of the order of 7 to 12 dB. The channel TCH may use, as references, only 10% of the symbols of the data train, giving 12 reference symbols per data train transmitted for the downward link and 24 reference symbols per data train transmitted for the upward link.

These symbols may be uniformly distributed, one by one, two by two or four by four, over an entire data train (reference blocks comprising 1, 2 or 4 reference symbols).

For better computation of the initial conditions for the estimation of the discrete channel, it is advisable to implement one of the two first forms of synchronization for the downward link.

Table 1 illustrates a mode of organization in which the reference blocks include 2 reference symbols. This organization is used for the channel TCH of the downward link.

TABLE 1

| Symbol No. | Field length | Contents of the field |
| --- | --- | --- |
| 0–1 | 2 | Guard symbols |
| 2–8 | 7 | Useful symbols |
| 9–10 | 2 | Explicit reference symbols |
| 11–28 | 18 | Useful symbols |
| 29–30 | 2 | Explicit reference symbols |
| 31–48 | 18 | Useful symbols |
| 49–50 | 2 | Explicit reference symbols |
| 51–68 | 18 | Useful symbols |
| 69–70 | 2 | Explicit reference symbols |
| 71–88 | 18 | Useful symbols |
| 89–90 | 2 | Explicit reference symbols |
| 91–108 | 18 | Useful symbols |
| 109–110 | 2 | Explicit reference symbols |
| 111–117 | 7 | Useful symbols |
| 118–119 | 2 | Guard symbols |

For the upward link, the third form (Table 2) is the most suitable for it makes it possible, at low cost, to do away with the need for the memory of the GMSK modulation in the choice of the initial conditions. In this particular case, only a part of the waveform corresponding to the blocks of four reference symbols is used to compute these initial conditions.

TABLE 2

| Symbol No. | Field length | Contents of the field |
| --- | --- | --- |
| 0–3 | 4 | Guard symbols |
| 4–17 | 14 | Useful symbols |
| 18–21 | 4 | Explicit reference symbols |
| 22–57 | 36 | Useful symbols |
| 58–61 | 4 | Explicit reference symbols |
| 62–97 | 36 | Useful symbols |
| 98–101 | 4 | Explicit reference symbols |
| 102–137 | 36 | Useful symbols |
| 138–141 | 4 | Explicit reference symbols |
| 142–177 | 36 | Useful symbols |
| 178–181 | 4 | Explicit reference symbols |
| 182–217 | 36 | Useful symbols |
| 218–221 | 4 | Explicit reference symbols |
| 222–235 | 14 | Useful symbols |
| 236–239 | 4 | Guard symbols |

The logic channel BCCH is especially used by the mobile terminals to carry out the synchronization in the data trains. The underlying real transmission channel is of the Rice type with a value K of the order of 0 dB. For these two reasons, 32 explicit reference symbols are planned.

Table 3 illustrates the corresponding structure of the data train.

TABLE 3

| Symbol No. | Field length | Contents of the field |
| --- | --- | --- |
| 0–1 | 2 | Guard symbols |
| 2–8 | 7 | Useful symbols |
| 9–10 | 2 | Explicit reference symbols |
| 11–28 | 18 | Useful symbols |
| 29–30 | 2 | Explicit reference symbols |
| 31–46 | 16 | Useful symbols |
| 47–72 | 26 | Explicit reference symbols (synchronization word) |
| 73–88 | 16 | Useful symbols |
| 89–90 | 2 | Explicit reference symbols |
| 91–108 | 18 | Useful symbols |
| 109–110 | 2 | Explicit reference symbols |
| 111–117 | 7 | Useful symbols |
| 118–119 | 2 | Guard symbols |

A part of these symbols (synchronization word) may then be assembled together in the middle of the data train to keep acceptable performance characteristics in terms of synchronization and determination of the maximum aperture of the eye diagram, in the receiver. The other part is then distributed over the rest of the data train, as is the case for the logic channel TCH.

The logic channel RACH is used in the upward link by the mobile terminals to request access to the services of the ICO system. The underlying real transmission channel is generally of the same type as that of the BCCH. Unlike the channel BCCH, which is repetitive, the channel RACH is sent in an isolated manner and therefore must be detected at one stroke. Consequently, the number of reference symbols is 44 (instead of 32 for the BCCH) as is specified in Table 4.

TABLE 4

| Symbol No. | Field length | Contents of the field |
| --- | --- | --- |
| 0–1 | 2 | Guard symbols |
| 2–7 | 6 | Explicit reference symbols |
| 8–31 | 24 | Useful symbols |
| 32–47 | 16 | Explicit reference symbols |
| 48–71 | 24 | Useful symbols (repetition) |
| 72–87 | 16 | Explicit reference symbols |
| 88–111 | 24 | Useful symbols (repetition) |
| 112–117 | 6 | Explicit reference symbols |
| 118–119 | 2 | Guard symbols |

As in the case of the logic channel BCCH, a part of these reference symbols may be assembled together in order to form synchronization references (two blocks of 16 symbols). However, since the GMSK modulation used is a memory modulation, the remaining reference symbols must also be grouped together before being distributed over the rest of the train. This grouping (two blocks of six reference symbols) makes it possible of course for the receiver to temporarily do without the need for the memory of the modulation to compute the initial conditions of the channel estimation iterative algorithm.

In this situation, there are therefore four reference blocks formed by six or 16 explicit reference symbols and three blocks formed by 24 implicit reference symbols corresponding to the repetition of the same useful symbols.

An advantageous compromise is thus achieved between the following:

the presence of relatively long reference blocks (six or 16 symbols) facilitating the synchronization;

the interlacing of the repetition code (three blocks distributed on the data train);

the number of distributed blocks (4+3) for the estimation of the channel.

As already indicated, the presence of explicit reference symbols is not obligatory although it enables the processing operations to be simplified. Implicit reference symbols alone, obtained by repetition, may also be used. Furthermore, it is recalled that the use of a repetition code is only a method that is advantageous, because of its simplicity, for the obtaining of implicit reference symbols. Indeed, these symbols can be obtained irrespective of the code used by analyzing the links generated between the useful symbols by this code [6, 9].

When both types of reference symbols are present, the implicit reference symbols are advantageously used to refine the channel estimation.

4. PRINCIPLE OF A RECEIVER

Figure 2:
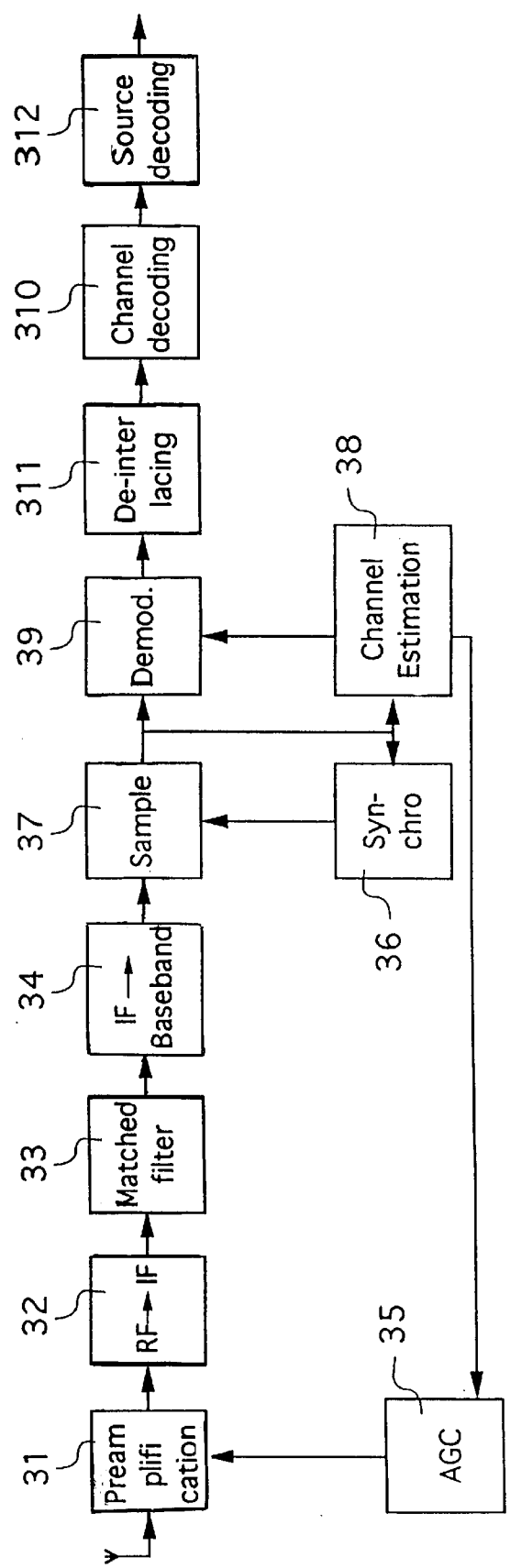
FIG. 2 is a block diagram of a receiver according to the invention, capable of receiving the signals of the invention.

FIG. 2 shows an exemplary receiver of a signal according to the invention as well as the corresponding reception method.

The signal corresponding to a received data train is preamplified at 31 then converted into an intermediate frequency at 32 in order to obtain the matched channel filtering at 33. The intermediate frequency signal is then converted into baseband at 34 on two channels in quadrature or on a single canal in low intermediate frequency and then sampled (37).

The sampled signal is then demodulated (39). Furthermore, it feeds a synchronization module 36 and an estimation module of the transmission channel 38.

The synchronization module 36 uses the synchronization sequence to estimate the symbol rate as well as the instants corresponding to the maximum aperture of the eye diagram of the baseband signal received. The signal is sampled (37) at these precise instants.

The samples corresponding to a data train are furthermore used by the receiver to determine an estimation 38, by the MAP criterion, of the realization of the discrete channel at the level of this channel. This estimation 38 is done by means of the simplified representation of the discrete channel in the data train received, the use of the EM algorithm and possibly an algorithm such as the Bahl algorithm [9].

This iterative algorithm, described hereinafter, starts from initial arbitrary conditions which may be obtained advantageously through the synchronization symbols known to the receiver.

The synchronization distributed throughout the data train according to the invention proves to be very useful because it makes it possible not only to prevent the convergence of the algorithm towards local maximum values of conditional probability but also to accelerate this convergence at low cost.

The receiver then uses the MAP estimation 38 of the discrete channel at a data train received to carry out the demodulation 39, according to a given criterion, of the information carrier symbols of this train. The demodulator 39 may especially give weighted outputs in order to improve the performance characteristics of the decoder 310.

These outputs, whether weighted or not, are first of all de-interlaced 311 and grouped together according to the interlacing and distribution done in the transmitter, and then decoded by the channel decoder 310. The modulated data elements are then decoded by the source decoder 312 in order to give an estimation of the source signal transmitted.

The channel estimation is also used by the receiver to check the progress of the preamplification 31 by means of an automatic gain correction (AGC) 35.

5. EXAMPLE: THE ICO SYSTEM

Figure 3:
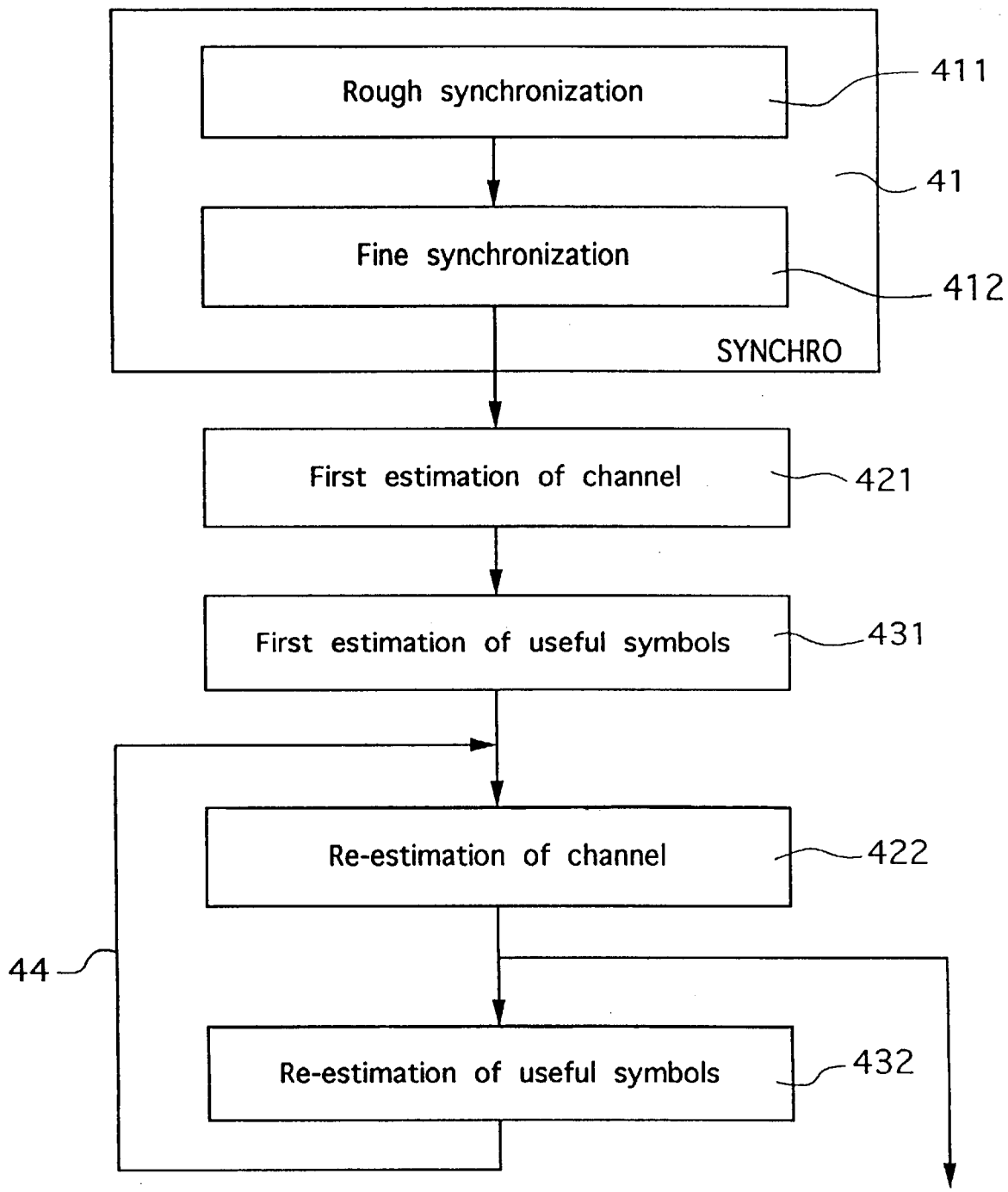
FIG. 3 gives a schematic view of the principles of the estimation of the transmission channel according to the invention.

As an example, and with reference to FIG. 3, some of the characteristics are given here below of the ICO system whose transmitter is present in the previous section. At the level of the mobile terminals, the synchronization 41 of the data trains is done first of all roughly or approximately at 411, through the detection of the power profile on the logic channel BCCH.

This synchronization is then refined at 412 through the use of the synchronization symbols of the data trains of the channel BCCH.

At the spatial segment (formed in the case of the ICO system by all the satellites and earth stations, with each satellite playing only a repeater role), the rough synchronization 411 and fine synchronization 412 are accomplished in the same way as by the mobile terminals, by using the logic channel RACH.

At the mobile terminals and the spatial segments, the estimation 421, 422 of the discrete channel at the level of a received data train is done according to the MAP criterion. This estimation is obtained through the algorithm described hereinafter. The receiver begins initially by using the synchronization symbols to set up the appropriate initial conditions 421 for the efficient functioning of the iterative algorithm.

At this step, the receiver has no idea, not even a partial one, of the values probably taken by the encoded information symbols. It then assigns these information symbols uniform values of conditional probability with maximum entropy at 431 (according to the method described more specifically hereinafter).

At the downward links, the symmetry of the constellations of the PWM2 for the BCCH and the PWM4 for the TCH then lead to a zero contribution of the information symbols in the computation of the initial conditions of the channel estimation iterative algorithm 44. These initial conditions are then used by this algorithm to enhance the channel estimation at 422; taking account this time of the additional contribution 432 of the encoded information symbols.

At the upward links, the channel estimation at the logic channels RACH and TCH roughly follows the same methods as in the case of the mobile terminals. The only difference here is that the GMSK modulation used in the upward link is a memory modulation.

Since the synchronization symbols transmitted by the mobile bodies are assembled together on a basis of at least four by four symbols (in the case of the TCH), the ISI due to the memory of the modulation and to the unknown adjacent symbols does not affect the symbols in the middle of each grouping. This symbols in the middle of each grouping may then be used to compute the initial conditions of the iterative algorithm. For the following iterations, the iterative algorithm then uses the GMSK modulation lattice to take account also of the remaining synchronization symbols and of the encoded information symbols (for example by means of the Bahl algorithm).

In the particular case of the RACH channel, the reception of the data trains by the spatial segment is done quasi-asynchronously. Furthermore, the implicit references corresponding to the three blocks of 24 symbols obtained by the repetition of a Golay code are performed. This characteristic of the invention enables a great improvement in channel estimation quality while also maintaining high synchronization quality, by means of the explicit references assembled together.

The position chosen for the implicit reference symbols is used to obtain the efficient interlacing of the words of the repetition code (3,1,3). Since the taking into account of the repetition code (3,1,3) may be integrated directly into the estimation algorithm (it should be possible to overlook the modulation memory in the first-order computation), it generates an imperceptible increase in the complexity of this algorithm.

6. MODEL-BUILDING AND REPRESENTING THE DISCRETE CHANNEL ACCORDING TO THE INVENTION

One of the aspects of the invention relies on an operation for building a model and a setting up a new simplified representation of the discrete channel seen at the output of the matched filter of the receiver at the data trains sent.

6.1 Building Up a Model of the Transmission Channel

The transmission channel is assumed to be of the Rice type. It is formed by a direct path and a multiple-path portion, with a relative delay that is almost zero with respect to the direct path. The direct path is specified by a constant complex attenuation factor. The multiple-path portion resulting from reflections on the ground is characterized for its part as a Gaussian stationary random process with zero mean [1, 16].

This channel is characterized chiefly by two parameters. The first parameter is the ratio K between the power of the direct path and that of the multiple paths. The second parameter is the DPS function of the channel $S_c(f)$.

This function is a power spectrum that gives the intensity of the transmission channel as a function of the Doppler frequency f. It is equal to the Fourier transform of the self-correlation function $f_c t$ of the channel. It has a bounded support with a width $B_D$ called the Doppler spread of the channel. In the context of the invention, this range is supposed to be small as compared with the symbol rate 1/T.

6.2 Model-building and Characteristics of the Signals Transmitted and Received The invention can be applied to many types of modulation. In the case of satellite communication, it relates particularly to the reception of phase-modulated data trains. This includes both conventional types of modulation (PWM2, PWM2, PWM8, PWM16, etc.) and types of modulation having a memory such as continuous phase modulation (MSK, GMSK, etc.).

The baseband signal corresponding to a transmitted data train with N symbols is written, in the case of an PWM modulation, in the following form (which is easily adaptable to other types of modulation [1]):

$$s(t) = \sum_{k=0}^{N-1} a_k x(t - kT)$$

where T is the symbol period, x(t) is a Nyquist root shaping filter with a norm equal to unity and the values $a_k$ are complex symbols belonging to an arbitrary alphabet A. The modulus of these symbols is equal to the square root of the baseband energy per symbol transmitted $2E_s$.

The signal at input of the receiver corresponds to the baseband signal transmitted in distorted form by the channel and corrupted by Gaussian white additive complex noise with a baseband spectral power equal to $2N_0$.

6.3 Setting Up a Model of the Sampled Signal at Output of the Matched Filter The Doppler spread $B_D$ is assumed to be low in relation to the symbol rate 1/T. Consequently, the samples obtained by the matched filtering of the received signal r(t) by the matched filter x*(−t) and the sampling of the resultant signal at the symbol rate at the instants of maximum aperture of the eye diagram may be approximated, whatever the type of modulation [1], by:

$$r_k = c_k a_k + n_k \quad k=0, 1, \ldots, N-1$$

In this expression, the terms $c_k$, k=0, 1, ..., N−1 represent a realization of the discrete channel at the level of the transmitted data train. In the case of the PWM, the $n_k$ values for their part represent the obtaining of a discrete Gaussian additive complex noise. They are independent and have $2N_0$ as their value of variance. The self-correlation function $f_c(l)$ of the discrete channel is deduced directly from that of the transmission channel $f_c(t)$ by the sampling of this channel at the symbol rate.

6.4 Simplified Representation of the Discrete Channel at the Data Train

One of the aims of the invention is to propose a completely novel approach to the simplified representation of the realizations of the discrete channel at the data trains transmitted. For each data train, the receiver uses the samples:

$$r_k = c_k a_k + n^k \quad k=0, 1, \ldots, N-1$$

at the output of the matched filter to detect the corresponding signals transmitted.

Let $(\cdot)^t$ be the transposition operator, $c \underline{\Delta} (c_0, c_1, \ldots c_{N-1})^t$ the vector representing the realization of the discrete channel at the level of data trains transmitted and L its matrix of covariance. The vector c may then be broken down into the form:

$$c = \sqrt{\phi_c(0)} \sum_{k=0}^{N-1} e_k b_k,$$

where the $b_k$ values are the eigen vectors of the matrix of covariance L of the vector and the $e_k$ values are independent complex Gaussian random variables whose variance values are equal to the eigen values $l_k$ of the matrix L associated with the vectors $b_k$ divided by $f_c(0)$.

The vectors $b_k$ form an orthonormal basis of the complex N-dimension canonical space. The corresponding eigen values are assumed to be arranged in a decreasing order. The DP of the vector $e \underline{\Delta}(e_0, e_1, \ldots e_{N-1})^t$ referenced p(e) is equal to the product of the Gaussian DP values of these components.

The matrix of covariance L is poorly conditioned because the Doppler spread $B_D$ is small as compared with the clock rate 1/T. Consequently, the eigen values $l_k$ show a very steep decrease and fade rapidly. One of the contributions of the invention is that it enables good use to be made of qualities of independence of the random variables $e_k$ and of the rapid decrease of the eigen values $l_k$ to substantially reduce the complexity of the estimator of the discrete channel.

In general, the receiver has incomplete knowledge of the characteristics of its local oscillator and of those of the DPS $S_c(f)$ of the transmission channel. In this case, the DPS that is most unpredictable from the viewpoint of information theory [7] is a flat spectrum with a bounded support having a width equal to the Doppler spread $B_D$.

Figure 5:
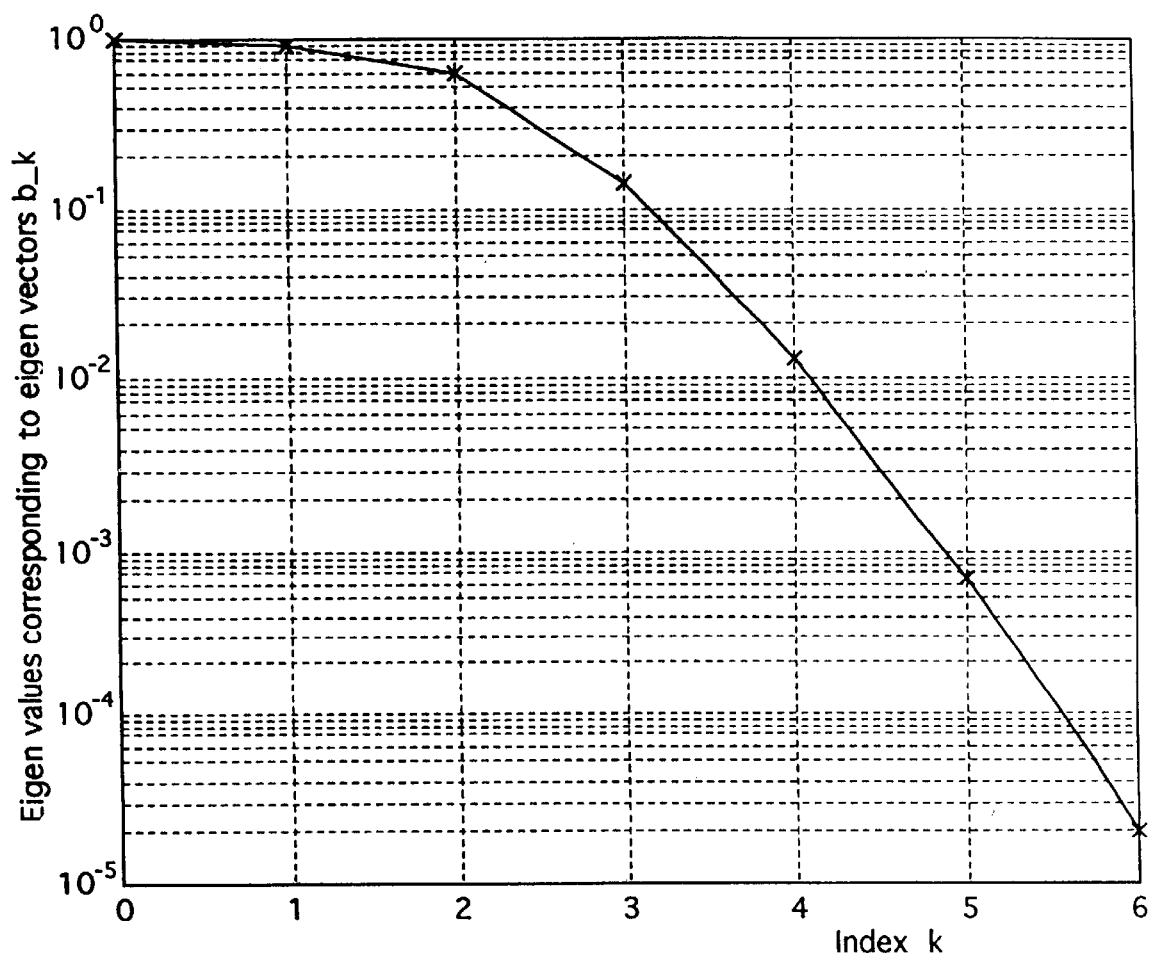
FIG. 5 illustrates the rapid decrease of the eigen values of the correlation matrix of the discrete channel with respect to the data trains transmitted.
Figure 6A:
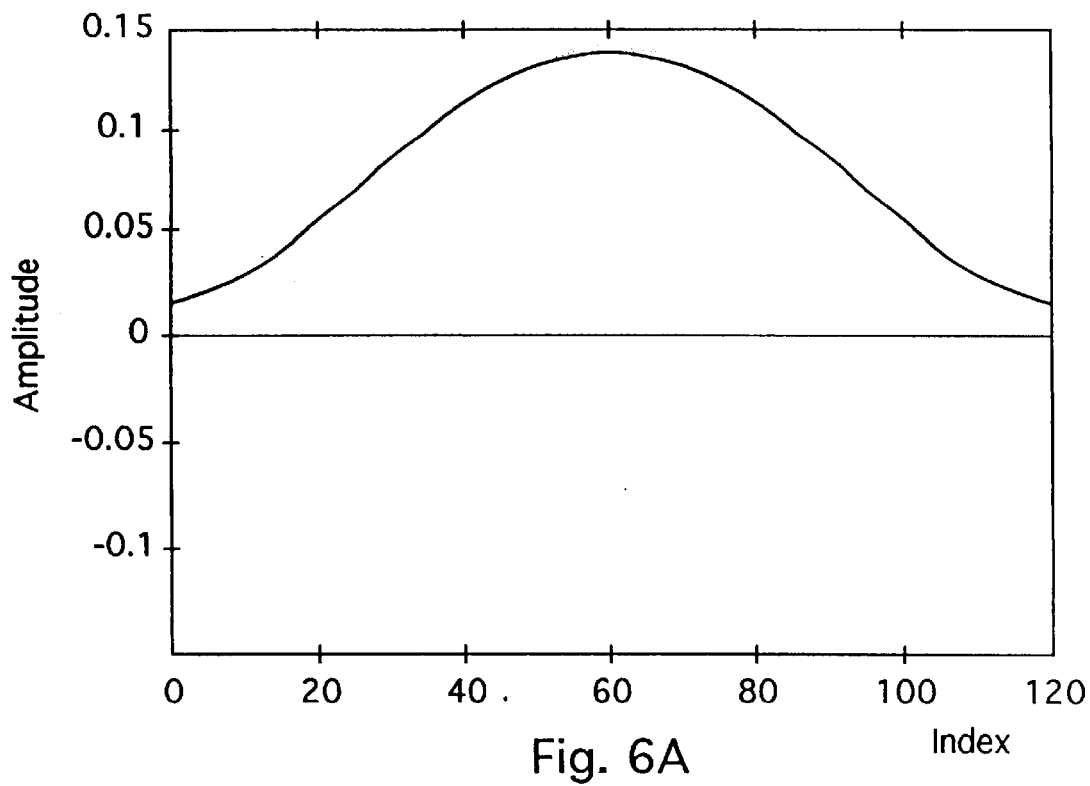
FIGS. 6A to 6G illustrate the eigen vectors corresponding to the most significant eigen values of the correlation matrix of the discrete channel with respect to the data trains transmitted, with FIG. 6A displaying the b1 eigenvector, FIG. 6B displaying the b2 eigenvector, FIG. 6C displaying the b3 eigenvector, etc.
Figure 6B:
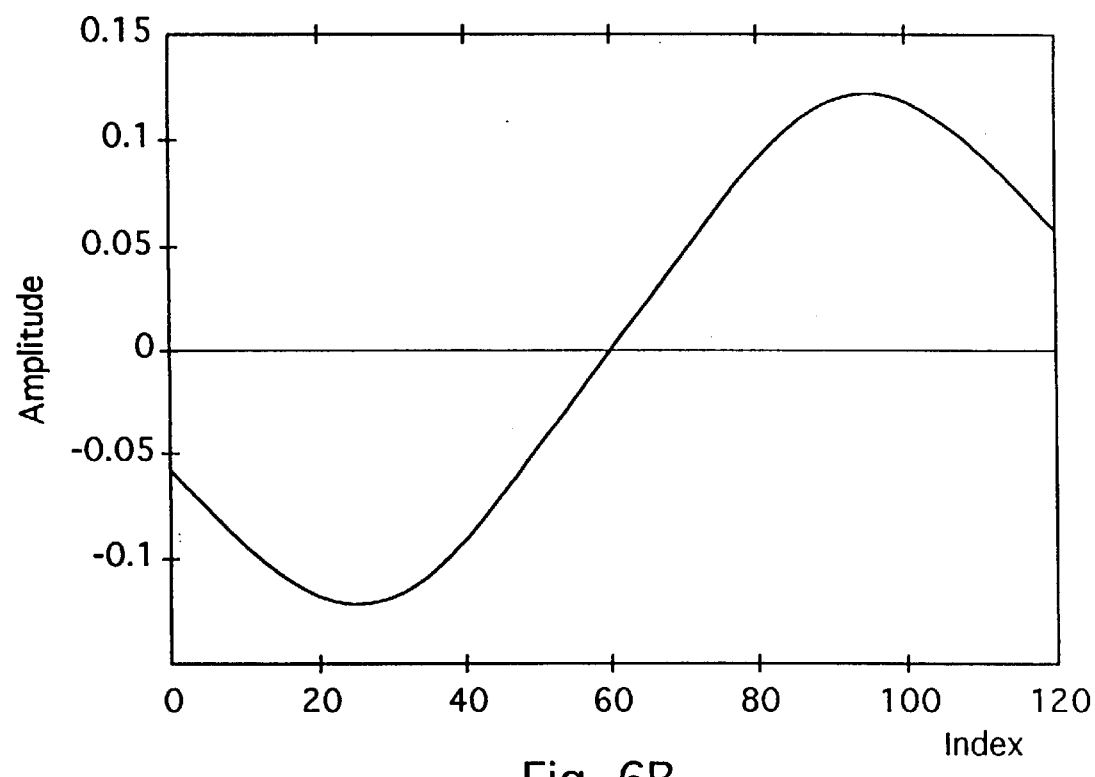
Figure 6C:
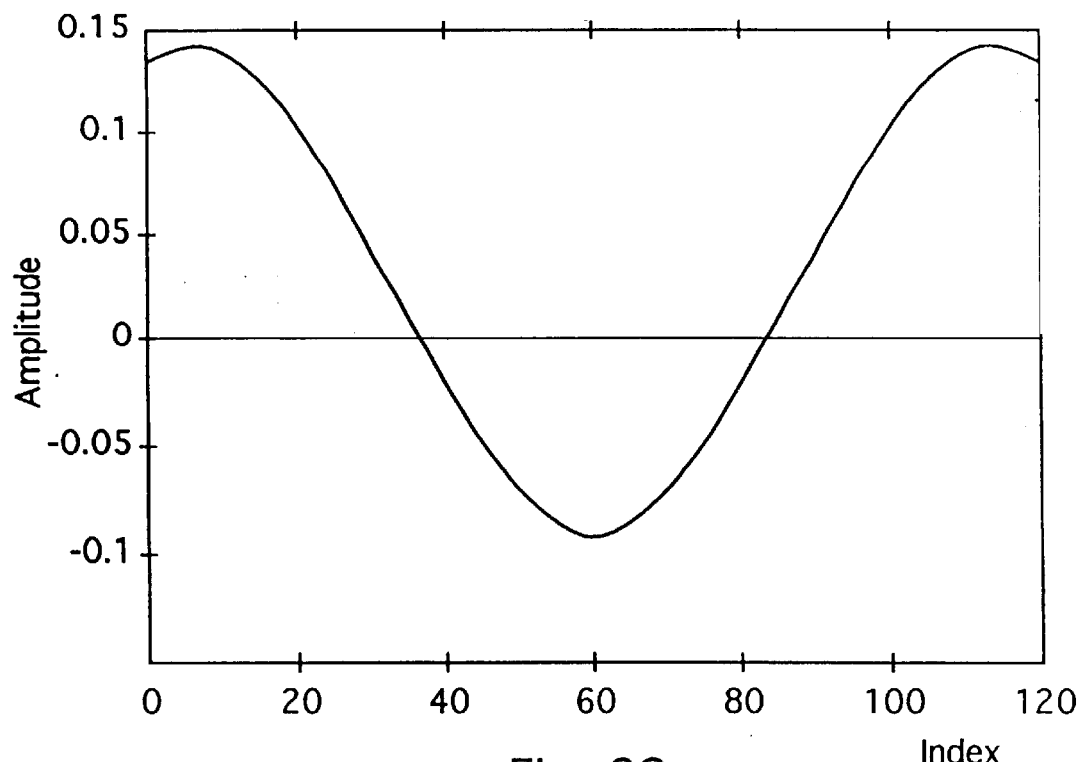
Figure 6D:
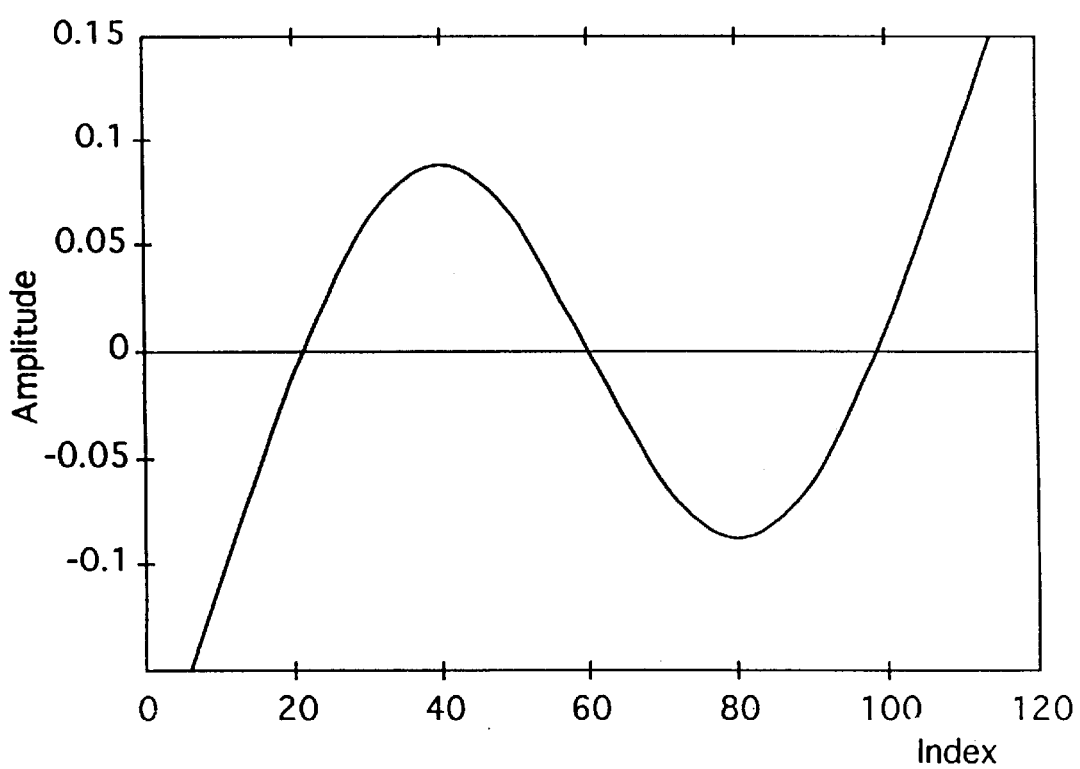
Figure 6E:
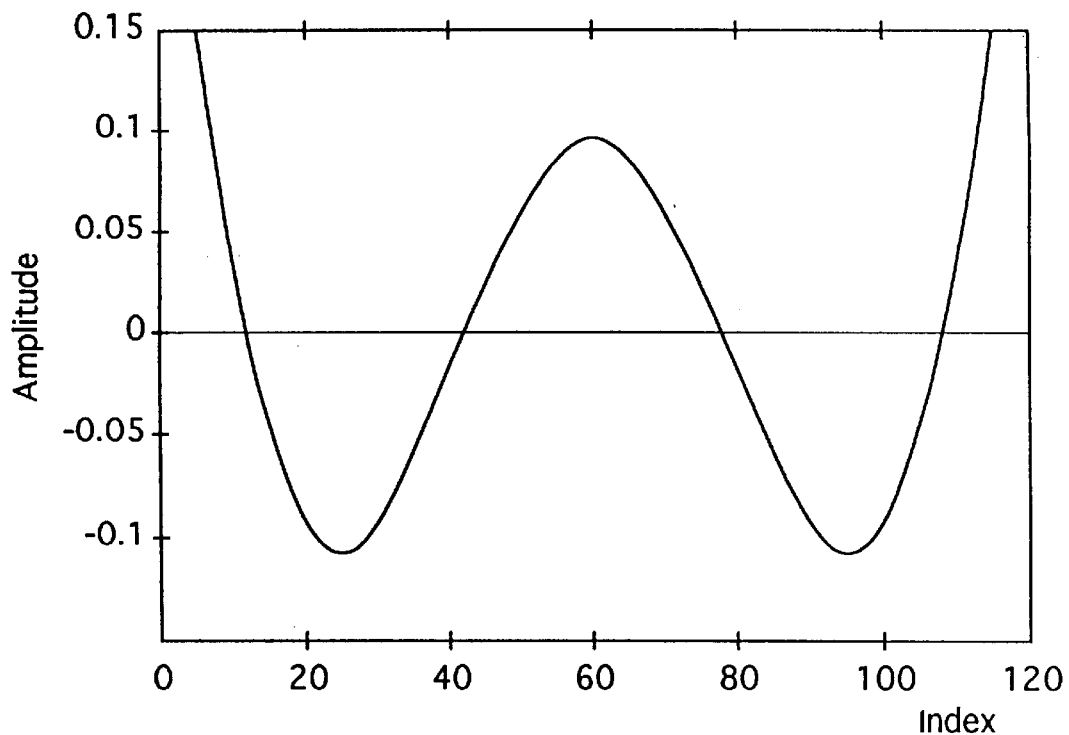
Figure 6F:
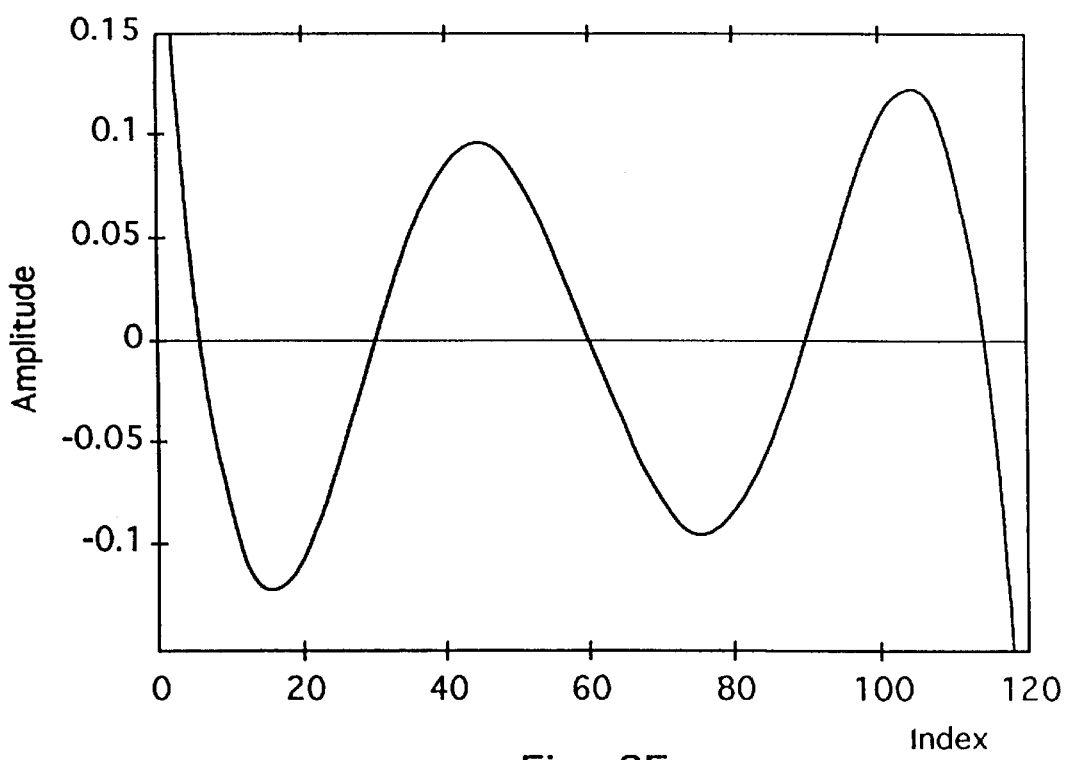
Figure 6G:
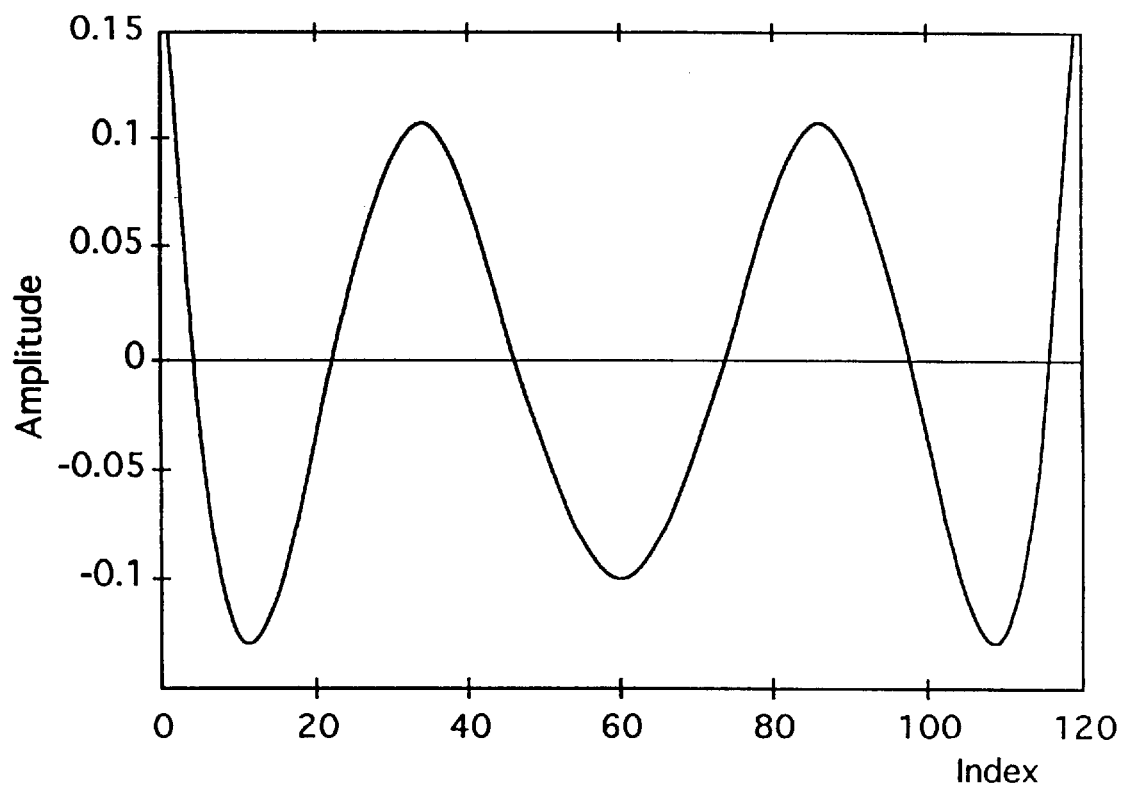

The eigen vectors $b_k$ are equal in this case to the restrictions on the support of the data train of well specified DPSS [8]. The first corresponding eigen values $l_k$, standardized by the multiplier factor $B_D T/f_c(0)$, are shown in FIG. 5 for N=120 and $B_D T=1/45$. The corresponding eigen vectors $b_k$ are also shown in FIGS. 6A to 6G.

7. ESTIMATION OF THE DISCRETE CHANNEL AT THE LEVEL OF A DATA TRAIN ACCORDING TO THE INVENTION

The invention proposes a simple iterative algorithm (FIG. 3) enabling the joint estimation of all the unknown parameters of the receiver, required by this receiver, for the efficient performance of the tasks for which it is responsible.

A non-exhaustive list of these parameters includes the realization c of the discrete channel, the variance of the noise $2N_0$ [6] and the mean energy per symbol received $2\overline{E}_s$ $\Delta \phi_c(0).2E_s$. If the a priori DP of an unknown parameter of the receiver is known, then it is recommended that this parameter be estimated according to the MAP criterion. If not, it is advised to resort to the ML criterion for the efficient performance of this estimation.

The DP of a realization c of the discrete channel at a transmitted data train is determined indirectly by the DP, p(e) of e which is of course well known to the receiver. The vector c may then be estimated according to the MAP criterion. The DP of $2N_0$ and of $2\overline{E}_s$ are generally unknown to the receiver. Their estimation is then generally accomplished according to the ML criterion.

Figure 4:
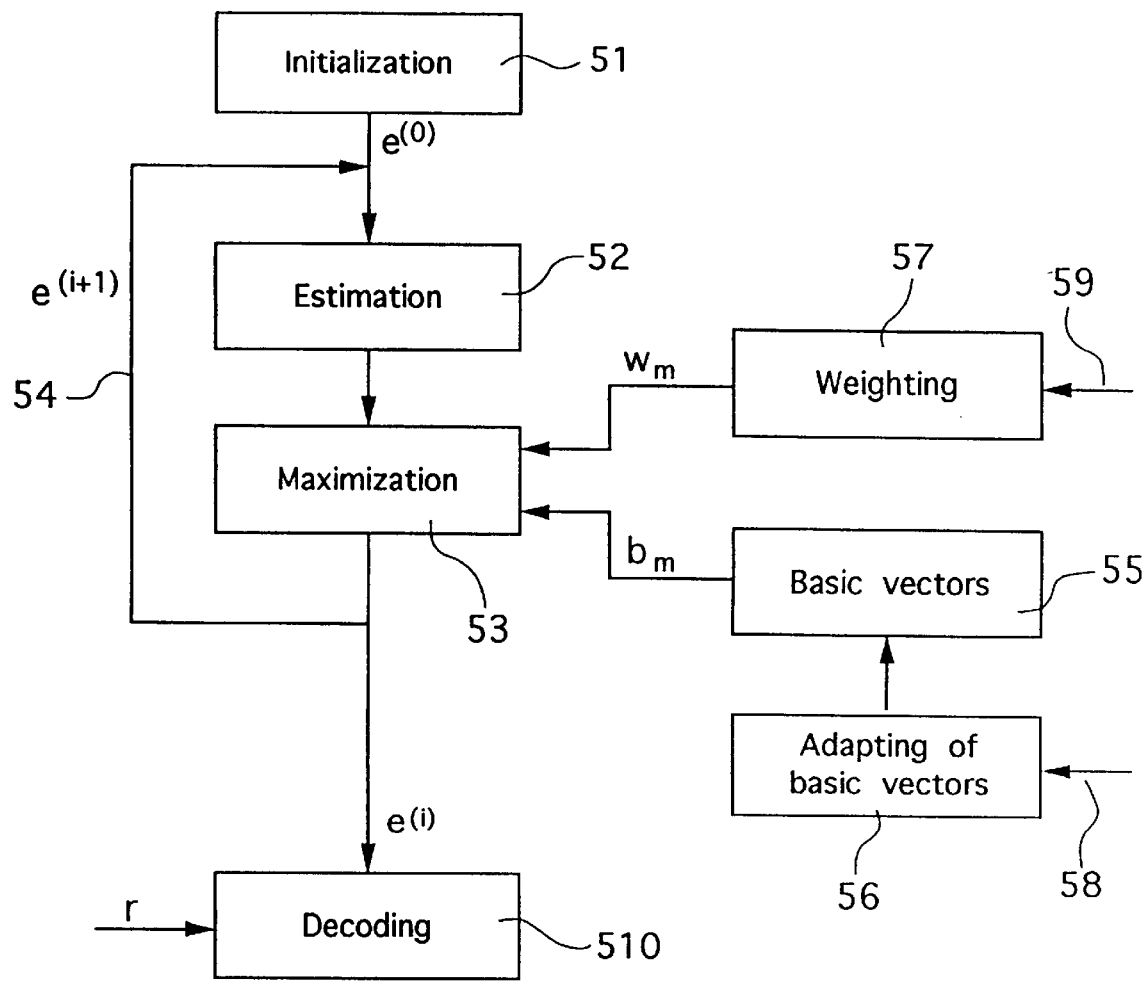
FIG. 4 shows the working of a receiver implementing a method according to the invention.

For example, and without any restriction, FIG. 4 shows the case of the estimation according to the MAP criterion of the discrete channel. The estimation of additional parameters such as the energy per symbol transmitted may be accomplished jointly with that of the channel without any great change in the final algorithm [6].

Let $r=(r_0, r_1, \ldots, r_{N-1})^t$, $a=(a_0, a_1, \ldots, a_{N-1})^t$, and $n=(n_0, n_1, \ldots, n_{N-1})^t$ respectively represent the vectors of received samples, transmitted symbols and noise. For reasons of error correction, synchronization and estimation of the discrete channel at the level of the data trains transmitted, some transmitted symbols are encoded or fixed. The vector a of transmitted symbols is then characterized by the discrete a priori DP (P(a)). The MAP estimation ĉ of c or, in an equivalent way, ê of e is the value $$\hat{e} = \underset{e}{\mathrm{argmax}} \, p(e \mid r)$$

which maximizes the a posteriori conditional DP p(e|r).

The direct resolution of this equation is a problem that is difficult to resolve. One of the contributions of the invention is that it proposes a simple solution to this problem through the use of the iterative algorithm EM. This algorithm achieves an inductive re-estimation of the vector e in such a way that a monotonic increase of the a posteriori conditional DP p(e|r) is ensured. This re-estimation is achieved through the maximizing of an auxiliary function Q(e,e') based on the measurement of the information of Kullback-Leibler as a function of the current vector e and of the new vector e'.

Given the vector received r, the algorithm EM starts with an initial arbitrary value 51 $e^{(0)}$ of the vector e. The progress from the estimation $e^{(i)}$ to the re-estimation $e^{(i+1)}$ is achieved through the auxiliary function Q(e,e') by the implicit performance of the following estimation and maximizing steps:

estimation step 52: compute $Q(e^{(i)},e')$, maximizing step 53: find the estimation $e^{(i+1)}$ which maximizes $Q(e^{(i)},e')$ as a function of e'.

Without any limit, the iterative estimation (54) of e may be done a finite number I times. This number is chosen in such a way that the estimation $e^{(I)}$ reached is close enough on an average to the optimum estimation ê to ensure an imperceptible downgrading of the performance characteristics of the receiver.

For a given transmitted data vector a and a given discrete channel realization c, the taking into account of the independence of the components of the noise vector n can be used to write the conditional DP p(r|a,e) of the vector of samples received r as the product of the Gaussian conditional DP values of the components of this vector.

Taking account of the explicit expression of the DP values p(e) and p(r|a,e) and of the preceding formulation of the algorithm EM, gives:

$$e_m^{(i+1)} = w_m \sum_{k=0}^{N-1} \left( \sum_{a \in A} \frac{a^*}{\sqrt{2E_s}} p(a_k = a \mid r, e^{(i)}) \right) \frac{r_k}{\sqrt{2E_s}} (b_k^{(m)})^*$$

as the explicit expression of the mth component of the estimation $e^{(i+1)}$.

In this expression, $b_k^{(m)}$ represents the kth component of the basic vector $b_m$ (55) as defined further above. In order to further improve the method, it can be planned to have the base of vectors 55 adapted in such a way as to correspond as well as possible to the channel to be estimated as a function of various criteria and especially the width of the Doppler spread 58. The parameter $w_m$ is a weighting factor 57 that depends on the mean signal-to-noise ratio $\overline{E}_s/N_0$ 59 at input of the receiver and of the eigen value $l_m$ divided by the power $f_c(0)$ of the discrete channel.

The weighing factors $w_m$ are thus obtained in the case of the estimation of the discrete channel according to the method of the least error squares with perfect knowledge of the data transmitted. They measure the quality of the contribution of a basic vector $b_m$ in the representation of the MAP estimation of the discrete channel.

When the power $l_m/f_c(0)$ of the mth component $e_m$ of e is greater than the standardized variance of noise $N_0/\overline{E}_s$, then the contribution of the basic vector $b_m$ in the representation of the channel estimation is very precise. The corresponding weighting $w_m$ is very close to 1.

When this power is smaller than the standardized variance of the noise, the taking into account of the basic vector $b_m$ in the estimation of the channel gives more noise than useful information. The weighting $w_m$ is then very close to 0. In this sense, the weightings $w_m$ play the same role and are based on the same principle as those of the adapted filter.

Figure 7:
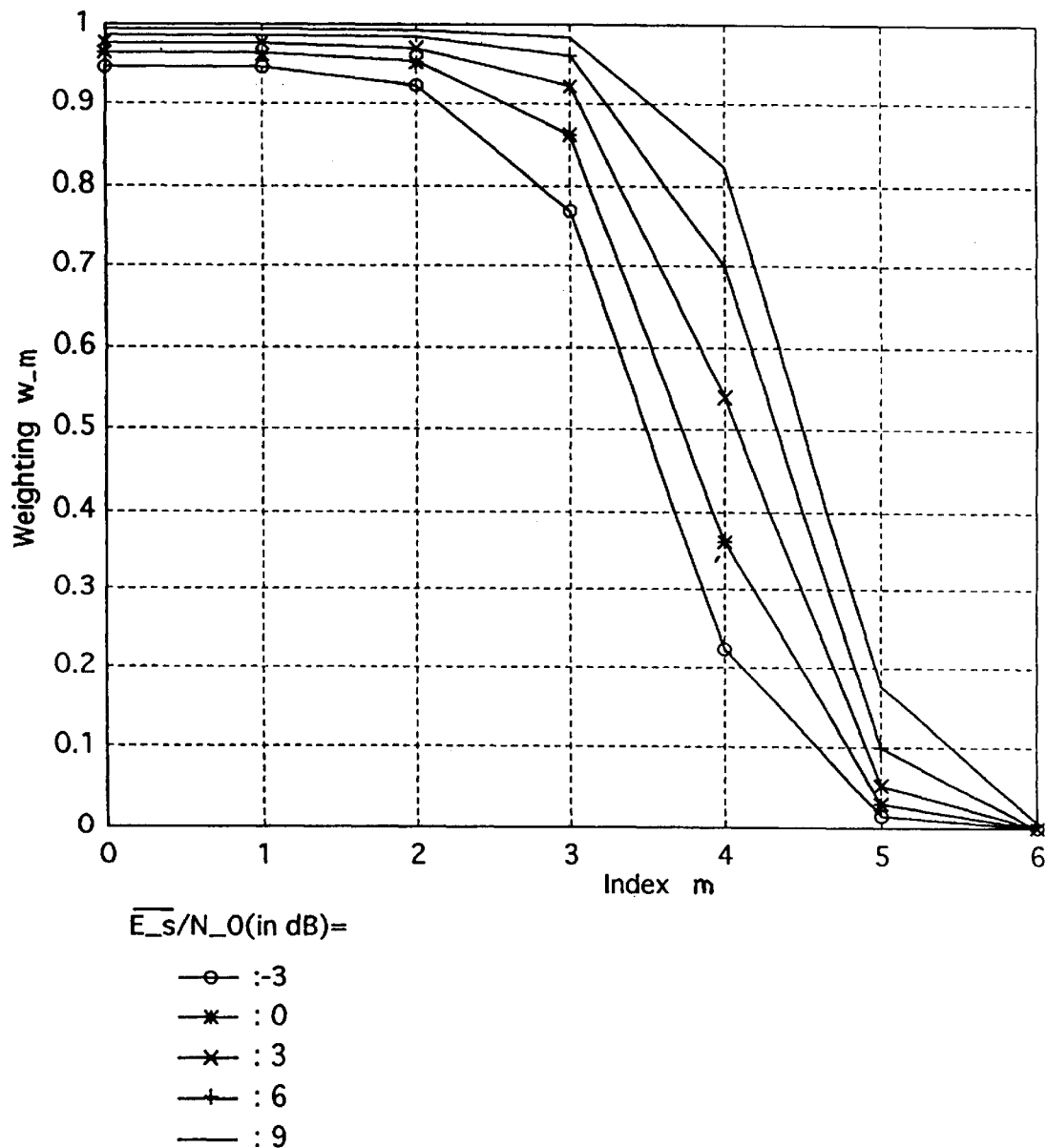
FIG. 7 illustrates the weighting operations of the eigen vectors, of the correlation matrix of the discrete channel with respect to the data trains transmitted, used in the estimation of the channel by the receiver.

As can be seen in FIG. 7 for N=120 and $B_DT=1/45$, the weighting coefficients $w_m$ fade away swiftly as a function of the index m for values of the mean signal-to-noise ratio $\overline{E}_s/N_0$ that are not excessively high. This is of course due to the very swift decrease of the eigen values $l_m$. One of the advantages of the invention then is that it is possible, in the channel estimation process and without any perceptible deterioration of the performance characteristics of the estimator, to retain only the first few coefficients of the $e^{(I)}$.

One of the other advantages of the invention is that it enables an improvement in the efficiency of the discrete channel estimation. This is obtained through the taking into account, by the receiver, of the memory due to the continuous phase modulations (MSK, GMSK, etc.), of the synchronization symbols and of a part or all of the encoded structure of the other symbols of the data train received.

The taking into account of the synchronization symbols in the channel estimation process is immediate. Let S be the set of indices of the synchronization symbols in a data train and $a_k$, k∈S, the values taken by these symbols. Since these values are known to the receiver, then the conditional DP $p(a_k=a|r,e^{(I)})$, k∈S may be routinely replaced by 1 for $a=a_k$. If not, it may be replaced by 0.

The taking into account of the memory of the phase modulation used or of the encoded structure of the remaining symbols is generally less systematic. It may be done for example indirectly by the determining, through the Bahl algorithm [9] or the SOVA algorithm [10], of the conditional DP values $p(a_k=a|r,e^{(I)})$ on the basis of the lattice of modulation and the codes used in the transmitter [13–15].

In the particular case where the modulation is without memory and the symbols are uncoded or are coded with simple codes such as repetition codes, the encoding structure may be integrated directly into the preceding formula.

This is also valid when, for reasons of complexity, all or a part of the encoding is not taken into account by the estimator. A typical example is that of the serial concatenated codes where the internal code is often the only one to be taken into account in the channel estimation. Another typical example is that of the encoded memory modulations where only the memory of the modulation is taken into account in the estimation process.

The value of the estimation of the channel on which the algorithm EM converges is to a great extent conditioned by the initial conditions used by this algorithm. If these initial conditions are badly chosen, the algorithm EM may converge towards estimations ê of e, corresponding to local maximum values of the a posteriori conditional DP p(e|r).

The best way to obtain these initial conditions is of course to use synchronization symbols that are perfectly known to the receiver. Other methods of removing ambiguity can also be envisaged.

The choice of the location of these synchronization symbols in the data trains transmitted is not only decisive for the quality of estimation of the channel but also for the efficient convergence of the algorithm EM towards the optimum estimation which maximizes p(e|r). The uniform distribution of the synchronization symbols in the data trains transmitted proves to be beneficial with respect not only to the efficient estimation of the channel but also to a more efficient stabilization and even acceleration of the convergence of the algorithm EM.

For the efficient running of the synchronization of the data trains in the receiver, it is sometimes necessary to assemble the synchronization symbols or distribute them on a small range of data trains. In this case, the algorithm EM has features of instability that may severely compromise the channel estimation quality.

One of the contributions of the invention is that it makes it possible to stabilize this algorithm by taking account of a part or of all of the encoded structure of the information symbols of the data train received. Simple codes such as the repetition codes whose code words are properly interlaced in the data trains may advantageously be used to accomplish this task of low-cost stabilization.

8. DEMODULATION AND DECODING OF DATA ACCORDING TO THE INVENTION

Let ê denote the Ith reestimation $e^{(l)}$, of e. Based on this estimation and on the vector r of samples at output of the matched filter, the detector or decoder 510 may be designed to minimize a given criterion. In particular, it may minimize the probability of error of the information or of the encoded modulated symbols.

For example, the optimum detector or decoder 510 which minimizes the probability of symbol error must find, for a given information symbol $a_k$, kœS, the symbol:

$$\hat{a}_k = \underset{a \in a}{\mathrm{argmax}} p(a_k = a \mid r, \hat{e})$$

which maximizes the conditional DP $p(a_k=a|r,\hat{e})$.

This detector may take account of the memory of the phase modulation used or the encoded structure of the symbols transmitted. This taking into account may be done especially through the Viterbi algorithm [11, 12], the Bahl algorithm [9], or the SOVA algorithm [10]. The latter two algorithms can be used to advantage if the receiver should require values of confidence of the decoded data elements. This is especially the case with communication systems that use a serially concatenated encoding system and in which the external decoder needs weighted outputs of the internal code to improve its performance characteristics.

In the particular case where the modulation is without memory and the symbols are not coded or are coded with simple codes such as repetition codes, the encoding structure may be directly integrated into the preceding formula.

APPENDIX: REFERENCES

[1] J. G. Proakis, <<Digital Communications>>, McGraw-Hill, New York, 1989.

[2] A. P. Dempster, N. M. Laird and D. B. Rubin, <<Maximum Likelihood from Incomplete Data via the EM Algorithm>>, J. Roy. Stat. Soc., Ser. 39, 1977.

[3] L. E. Baum, T. Petrie, G. Soules and N. Weiss, <<A Maximisation Technique Occurring in the Statistical Analysis of Probabilistic Functions of Markov Chains>>, Ann. Math. Stat., vol. 41, 1970.

[4] L. A. Liporace, <<Maximum Likelihood Estimation for Multivariate Observations of Markov Sources>>, IEEE Trans. Inform. Theory, IT-28, September 1982.

[5] B. H. Juang, <<Maximum Likelihood Estimation for Mixture multivariate Stochastic Observations of Markov Chains>>, AT&T Technical Journal, vol. 64, no. 6, July) August 1985.

[6] G. K. Kaleh, <<Joint Carrier Phase Estimation and Symbols Decoding of Trellis Codes>>, International Symposium on Information Theory, San Diego, Calif., January 1990.

[7] Louis L. Scharf, <<Statistical Signal Processing: detection, estimation, and time series analysis>>, Addison-Wesley Publishing Company, New York, 1991.

[8] D. Slepian, <<Prolate Spheroidal Wave Functions, Fourier Analysis and Uncertainty—V: The Discrete Case>>, BSTJ, May–June 1978.

[9] L. R. Bahl, J. Cocke, F. Jelinek and J. Raviv, <<Optimal Decoding of Linear Codes for Minimizing Symbol Error Rate>>, IEEE Transactions on Information Theory, vol. IT-20, March 1974.

[10] J. Hagenauer et P. Hoeher, <<A Viterbi Algorithm with Soft-Decision Outputs and its Applications>>, GLOBECOM'89, Dallas, Tex., November 1989.

[11] G. D. Forney, Jr., <<The Viterbi Algorithm>>, Proc. IEEE, 61, Mars 1973.

[12] G. D. Forney, Jr., <<Maximum Likelihood Sequence Estimation of Digital Sequences in the Presence of Intersymbol Interference>>, IEEE Trans. Inf. Theory, IT-18, May 1972.

[13] J. K. Wolf, <<Efficient Maximum Likelihood Decoding of Linear Block Codes Using a Trellis>>, IEEE Transactions on Information Theory, vol. IT-24, no. 1, Janvier 1978.

[14] G. D. Forney, Jr., <<The Viterbi Algorithm>>, Proc. of the IEEE, vol. 61, no. 3, Mars 1973.

[15] G. D. Forney, Jr., <<Coset Codes—Part II: Binary Lattices and Related Codes>>, IEEE Transactions on Information Theory, vol. 34, no. 5, September 1988.

[16] R. S. Kennedy, <<Fading Dispersive Communication Channels>>, John Wiley & Sons, 1969.

What is claimed is:

1. A method for estimation of a channel for transmission of a digital signal organized in consecutive data trains each comprising a predetermined number of successive symbols, the method comprising:

receiving said data trains, each of said data trains comprising at least two distinct reference blocks for the estimation of said channel, distributed among useful symbols representing a source signal to be transmitted, each of said reference blocks being formed by at least one reference symbol known to a receiver and/or identifiable by said receiver; and writing said estimation in the form of a combination of predetermined base functions, each of said base functions having a bandwidth greater than or equal to that of a Doppler power spectrum of said signal;

implementing an estimation-maximization algorithm comprising the following steps for each of said data trains:

extraction and/or determination of said explicit reference symbols, to obtain a first estimation of said transmission channel;

a first estimation of said useful symbols as a function of said first estimation of the transmission channel intended to feed a decoder if said first estimation of said useful symbols meets a predetermined quality requirement;

and if said first estimation of said useful symbols fails to meet the predetermined quality requirement, at least one iteration of the following steps:

determination of a second, more precise estimation of said transmission channel as a function of said first estimation of the useful symbols; and a second estimation of said useful symbols as a function of said second estimation of the transmission channel intended to feed said decoder.

2. A method according to claim 1, wherein said step for the second estimation of said useful symbols is integrated into said step for determining a second estimation of the transmission channel, the second estimation of the useful symbols being used directly in the computation of the second estimation of the transmission channel.

3. A method according to claim 1, wherein said reference blocks are equally distributed in said data train.

4. A method according to claim 1, further comprising:
a preliminary step for matching of characteristics of said base functions according to said Doppler power spectrum.

5. A method according to claim 1, wherein said reference symbol comprises at least one implicit reference symbol derived from said useful symbols by a predetermined encoding operation and placed at predetermined locations in said data train.

6. A method according to claim 5, wherein said reference blocks are equally distributed in said data train.

7. A method according to claim 1, further comprising:
a preliminary step for matching of characteristics of said base functions according to said Doppler power spectrum.

8. The method of claim 7, wherein said base functions are discrete prolate spheroidal sequences (DPSS).

9. A device for estimation of a channel for transmission of a digital signal organized in consecutive data trains each comprising a predetermined number of successive symbols,
each of said data trains comprising at least two distinct reference blocks for the estimation of said channel, distributed among useful symbols representing a source signal to be transmitted,
each of said reference blocks being formed by at least one reference symbol known to a receiver and/or identifiable by said receiver,
wherein the device comprises means to implement an estimation-maximization algorithm comprising:
means for extraction and/or determination of said reference symbols present in each of said data trains;
means for analysis of said reference symbols to obtain a first estimation of said transmission channel;
first means for the estimation of said useful symbols, as a function said first estimation of the transmission channel;
means for determining a second, more precise estimation of said transmission channel, as a function of said first estimation of the useful symbols;
second means for the estimation of said useful symbols, as a function of said second estimation of the transmission channel,
said second estimation means being looped to said means for determining a second estimation of said transmission channel.

10. A device according to claim 9, wherein said reference blocks are equally distributed in said data train.

11. The device according to claim 9, said device further comprising:
means for the writing of said estimation in the form of a combination of predetermined base functions, with a bandwidth greater than or equal to that of a Doppler power spectrum of said signal, wherein said base functions are discrete prolate spheroidal sequences (DPSS).

12. A device according to claim 9, wherein said reference symbol comprises at least one implicit reference symbol derived from said useful symbols by a predetermined encoding operation and placed at predetermined locations in said data train.

13. A device according to claim 12, wherein said at least one implicit reference symbol corresponds to a repetition of useful symbols, according to a repetition code.

14. A device according to claim 13, wherein said reference blocks are equally distributed in said data train.

15. A device according to claim 12, wherein said reference blocks are equally distributed in said data train.

* * * * *